US 8,503,823 B2

(12) United States Patent
Liu et al.

(10) Patent No.: US 8,503,823 B2
(45) Date of Patent: Aug. 6, 2013

(54) METHOD, DEVICE AND DISPLAY SYSTEM FOR CONVERTING AN IMAGE ACCORDING TO DETECTED WORD AREAS

(75) Inventors: Yuan Liu, Shenzhen (CN); Song Zhao, Shenzhen (CN); Jing Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/284,227

(22) Filed: Oct. 28, 2011

(65) Prior Publication Data

US 2012/0045147 A1     Feb. 23, 2012

Related U.S. Application Data

(63) Continuation of application No. PCT/CN2010/072178, filed on Apr. 25, 2010.

(30) Foreign Application Priority Data

Apr. 30, 2009   (CN) .......................... 2009 1 0136155
May 12, 2009   (CN) .......................... 2009 1 0138672

(51) Int. Cl.
*G06K 9/20*  (2006.01)
(52) U.S. Cl.
USPC ......................................................... 382/282
(58) Field of Classification Search
None
See application file for complete search history.

(56) References Cited

U.S. PATENT DOCUMENTS

| 2001/0019334 | A1 | 9/2001 | Carrai et al. |
| 2003/0099410 | A1 | 5/2003 | Daigi |
| 2005/0179817 | A1 | 8/2005 | Kida |
| 2005/0226538 | A1 | 10/2005 | Di et al. |
| 2005/0265460 | A1* | 12/2005 | Jang .......................... 375/240.29 |
| 2006/0153452 | A1* | 7/2006 | Kjeldsen et al. .............. 382/176 |
| 2008/0240553 | A1 | 10/2008 | Tamai et al. |
| 2009/0110287 | A1 | 4/2009 | Bates et al. |
| 2011/0170802 | A1 | 7/2011 | Liu et al. |

FOREIGN PATENT DOCUMENTS

CN            1139338 A      1/1997
(Continued)

OTHER PUBLICATIONS

Office Action issued in corresponding Chinese Patent Application No. 200910136155.7, mailed May 24, 2010.
Extended European Search Report issued in corresponding European Patent Application No. 10769288.1, mailed Feb. 17, 2012.

(Continued)

*Primary Examiner* — Nirav G Patel
(74) *Attorney, Agent, or Firm* — Brinks Hofer Gilson & Lione

(57) ABSTRACT

An image conversion method, a conversion device, and a display system are provided in the embodiments of the present invention. The image conversion method includes: performing word area detection on an image to acquire a detected word area; and performing conversion processing on the image according to the word area to acquire a converted image that has an aspect ratio different from that of an unconverted image. The conversion device includes: a detection unit, configured to perform word area detection on an image to acquire a detected word area; and a conversion unit, configured to perform conversion processing on the image according to the word area to acquire a converted image that has an aspect ratio different from that of an unconverted image. In this way, an important content area of the image may be retained and clearly displayed.

12 Claims, 4 Drawing Sheets

FOREIGN PATENT DOCUMENTS

| | | | |
|---|---|---|---|
| CN | 1351735 | A | 5/2002 |
| CN | 1496659 | A | 5/2004 |
| CN | 1642226 | A | 7/2005 |
| CN | 1659591 | A | 8/2005 |
| CN | 1878356 | A | 12/2006 |
| CN | 101193235 | A | 6/2008 |
| CN | 101276413 | A | 10/2008 |
| CN | 101365077 | A | 2/2009 |
| CN | 101419661 | A | 4/2009 |
| CN | 101547323 | A | 9/2009 |
| EP | 0785529 | A1 | 7/1997 |
| EP | 0820038 | A2 | 1/1998 |
| JP | 11203467 | A | 7/1999 |
| JP | 2006313415 | A | 11/2006 |
| JP | 2007060105 | A | 3/2007 |
| WO | WO 03102903 | A2 | 12/2003 |

OTHER PUBLICATIONS

International Search Report and Written Opinion of the International Searching Authority issued in corresponding PCT Patent Application No. PCT/CN2010/072178, mailed Jul. 29, 2010.

Hwang et al., "Adaptive Image Interpolation Based on Local Gradient Features" IEEE Signal Processing Letters, vol. 11 No. 3, Mar. 2004.

Wolf et al., "Non-homogeneous Content-driven Video-retargeting" IEEE 11th International Conference on Computer Vision 2007.

Zhang et al., "Shrinkability Maps for Content-Aware Video Resizing" Pacific Graphics, vol. 27 No. 7, 2008.

International Search Report issued in corresponding PCT Patent Application No. PCT/CN2009/071157, mailed Jan. 7, 2010.

\* cited by examiner

METHOD, DEVICE AND DISPLAY SYSTEM FOR CONVERTING AN IMAGE ACCORDING TO DETECTED WORD AREAS

CROSS-REFERENCE TO RELATED APPLICATIONS

This application is a continuation of International Application No. PCT/CN2010/072178, filed on Apr. 25, 2010, which claims priorities to Chinese Patent Application No. 200910136155.7, filed on Apr. 30, 2009 and Chinese Patent Application No. 200910138672.8, filed on May 12, 2009, all of which are hereby incorporated by reference in their entireties.

FIELD OF THE INVENTION

The present invention relates to the field of image processing technologies, and in particular, to an image conversion method, a conversion device, and a display system.

BACKGROUND OF THE INVENTION

In an image processing technology, image conversion generally includes operations such as image scaling. When the image scaling is performed in different ratios, because aspect ratios of a source image and a target image are not consistent, image distortion is likely to be caused. A typical application scenario is image adaptation between images that have aspect ratios of 4:3 and 16:9. For example, a traditional Cathode Ray Tube (CRT) television generally adopts a 4:3 image display mode, and the latest Liquid Crystal Display (LCD) television adopts a 16:9 image display mode. Therefore, a problem of non-uniform ratio resolution conversion of the images that have the aspect ratios of 4:3 and 16:9 exists.

In the image conversion, generally, human eyes are sensitive to an important content area (for example, an area with words) in the image, so when the image scaling is performed in different ratios, the word area in the image shall be retained as much as possible and the distortion shall be as small as possible. The image scaling from the aspect ratio of 4:3 to the aspect ratio of 16:9 in a video conference scenario is taken as an example. In the prior art, a simplest linear scaling algorithm is generally adopted. In this case, an important content area, such as words in the image, is greatly distorted. Moreover, a cropping algorithm may also be adopted to perform cropping on edges of an image, so that an aspect ratio of a cropped area is consistent with that of a target image. In this case, image distortion is not caused, but all or a part of a word area of the image is likely to be lost.

During the research and implementation of the method, the inventors of the present invention find that: in the image conversion method in the prior art, an important content area, such as a word area in the image is likely to be distorted or to be lost.

SUMMARY OF THE INVENTION

Embodiments of the present invention provide an image conversion method, a conversion device, and a display system, so that an important content area of an image may be retained and clearly displayed.

An image conversion method includes: performing word area detection on an image to acquire a detected word area; and performing conversion processing on the image according to the word area to acquire a converted image that has an aspect ratio different from that of an unconverted image.

A conversion device includes: a detection unit, configured to perform word area detection on an image to acquire a detected word area; and a conversion unit, configured to perform conversion processing on the image according to the word area to acquire a converted image that has an aspect ratio different from that of an unconverted image.

A display system includes: a conversion device, configured to perform word area detection on an image to acquire a detected word area and perform conversion processing on the image according to the word area to acquire a converted image that has an aspect ratio different from that of an unconverted image; and a display device, configured to display the converted image.

It may be seen from the technical solution that, in the embodiments of the present invention, the word area detection is first performed on the image to acquire the detected word area, and then non-uniform ratio resolution conversion processing is performed on the image according to the word area, so that an important content area, such as the word area, in the converted image is not lost and may be retained and displayed without distortion.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following description merely show some of the embodiments of the present invention, and persons skilled in the art may obtain other drawings according to the accompanying drawings without creative efforts.

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are a part rather than all of the embodiments of the present invention. All other embodiments obtained by persons skilled in the art based on the embodiments of the present invention without creative efforts shall fall within the protection scope of the present invention.

The embodiments of the present invention provide an image conversion method, a conversion device, and a display system, so that an important content area of an image may be retained and displayed without distortion. Details are described in the following.

Figure 1:
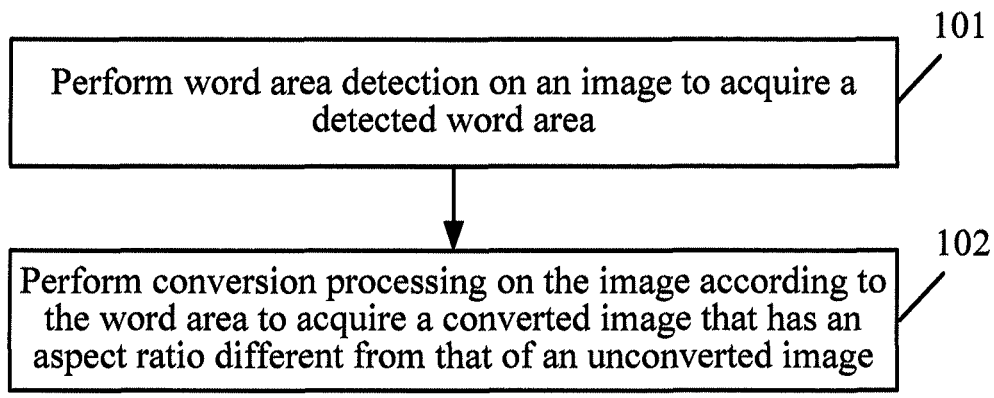
FIG. 1 is a flow chart of an image conversion method according to Embodiment 1 of the present invention.

FIG. 1 is a flow chart of an image conversion method according to Embodiment 1 of the present invention. The method mainly includes the following steps:

Step 101: Perform word area detection on an image to acquire a detected word area.

In this step, a positioning algorithm combining an edge-based algorithm and a texture-energy-based algorithm may be adopted to perform the word area detection on the image to acquire the detected word area.

Step 102: Perform conversion processing on the image according to the word area to acquire a converted image that has an aspect ratio different from that of an unconverted image.

The conversion processing performed on the image according to the word area is non-uniform ratio resolution conversion processing. Non-uniform ratio resolution indicates that an aspect ratio of resolution of the unconverted image is different from an aspect ratio of resolution of the converted image.

The conversion processing may be scaling processing or cropping processing. The scaling processing includes: setting a weight of the word area to a high weight, setting a weight of the non-word area to a low weight, and performing scaling on the image according to a set aspect ratio by adopting a non-linear scaling algorithm according to the weight of the word area and the weight of the non-word area. The low weight and the high weight may be set according to experience. For example, a value range of the weight is [0, 1]. In an actual application, it may be agreed that a weight with a value larger than 0.8 is a high weight and a weight with a value smaller than 0.2 is a low weight. The weight values of the high weight and the low weight may also be divided in a grading manner according to the number of words included in the area. For example, when a certain area includes many words, the weight may be set to 0.9, and when a certain area does not includes so many words, the weight may be set to 0.7. The low weight may also be set in the foregoing manner. The number of the words included in the area may be detected in multiple manners. For example, the number of the words included in the area may be determined by calculating texture energy of the area or identifying the words. The cropping processing includes: cropping the image according to a set aspect ratio by adopting a cropping algorithm according to the word area. The cropped image includes the word area.

It may be seen from content of Embodiment 1 that, in the embodiment of the present invention, word area detection is first performed on the image to acquire the detected word area, and then the non-uniform ratio resolution conversion processing is performed on the image according to the word area, so an important content area, such as the word area, in the converted image is not lost and may be retained and displayed without distortion.

The technical solutions according to Embodiment 2 and Embodiment 3 of the present invention are described below in further detail.

Figure 2:
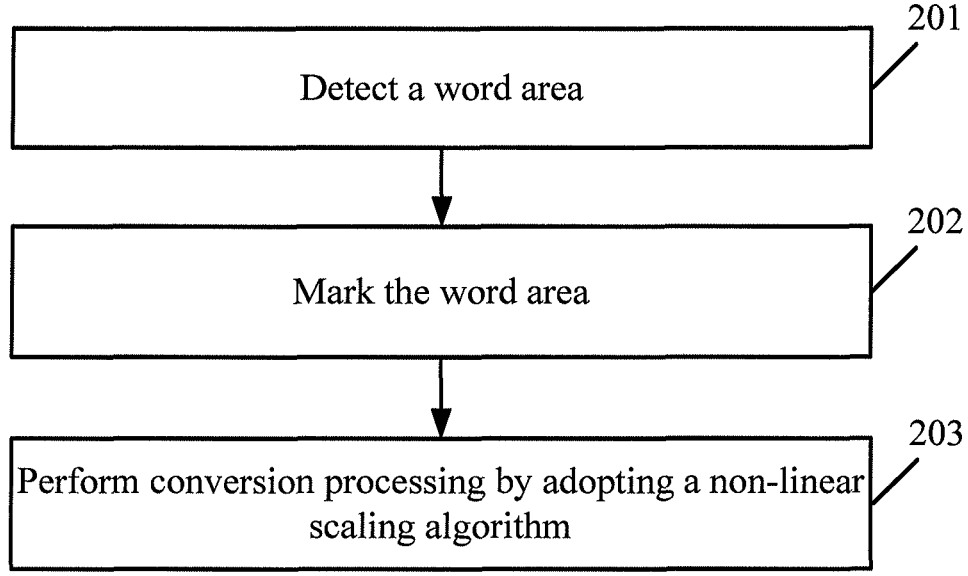
FIG. 2 is a flow chart of an image conversion method according to Embodiment 2 of the present invention.

FIG. 2 is a flow chart of an image conversion method according to Embodiment 2 of the present invention. The method mainly includes the following steps:

Step 201: Detect a word area.

After an input image is acquired, the word area of the image is detected to acquire a detected word area.

Generally, common word area positioning algorithms include: a connected-domain-based positioning algorithm, an edge-based positioning algorithm, and a texture-energy-based positioning algorithm.

The connected-domain-based positioning algorithm performs word area positioning mainly by employing color characteristics of the word area. The edge-based positioning algorithm performs the word area positioning mainly by employing characteristics that edges of the word area are dense and have a regular directionality, but because densities and directions of edges of different words have different characteristics and background content is unknown, the edge-based positioning algorithm needs to be used in combination with other algorithms. The texture-energy-based positioning algorithm performs the word area positioning mainly by regarding the word area as a special texture. The texture—energy-based method has strong robustness.

In the embodiment of the present invention, a positioning algorithm combining an edge-based algorithm and a texture-energy-based algorithm is adopted. The algorithm calculates texture energy of different areas of the image through Discrete Cosine Transform (DCT), preliminarily positions the word area according to the texture energy, and accurately positions the word area according to an edge constraint condition.

Figure 3:
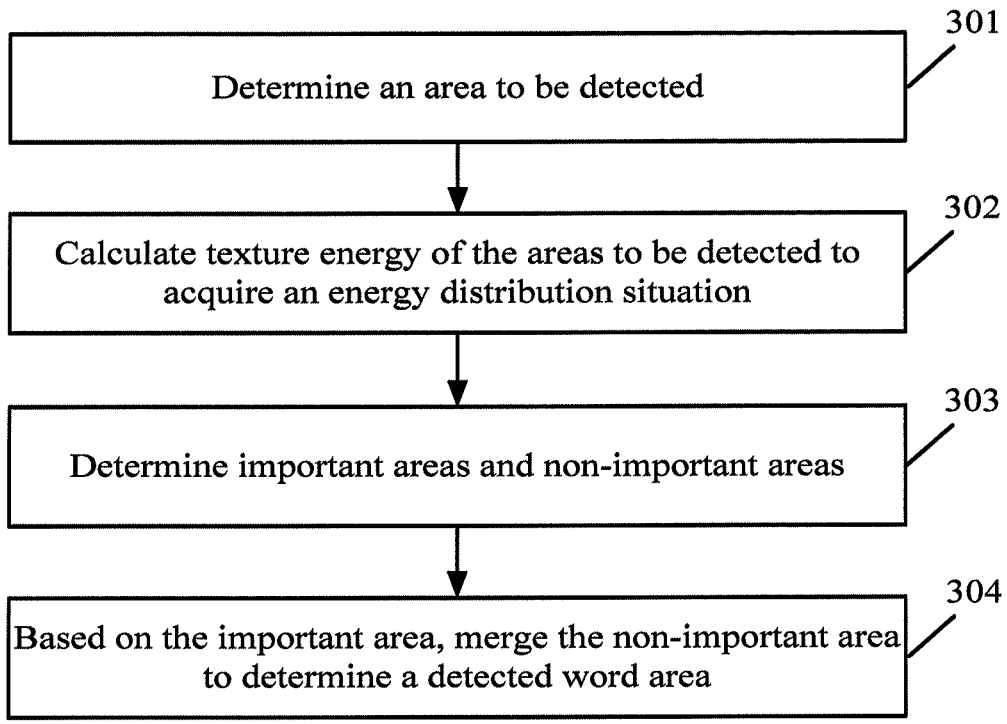
FIG. 3 is a flow chart of detecting a word area according to Embodiment 2 of the present invention.

For the process in step 201, reference may be made to FIG. 3. FIG. 3 is a flow chart of detecting a word area according to Embodiment 2 of the present invention. The detecting process specifically includes the following steps:

301: Determine an area to be detected.

First, the area to be detected is preliminarily determined. In order to ensure the display of content in a picture, a word area of an image may generally be located at an edge location of the image, so the edge location of the image may be determined as the area to be detected. A video conference system detecting conference information is taken as an example. A location displaying the conference information is generally upper, lower, left, and right edge locations of an image and/or four corner locations of the image, so the upper, lower, left, and right edge locations and/or the four corner locations may be selected as the area to be detected. It may be understood that, for the area to be detected, the location of the word area in a regular situation is mainly considered, and when the word area in an irregular situation is detected, it may be agreed that the whole picture is regarded as a word detection area, which is not limited in this embodiment.

302: Calculate texture energy of the areas to be detected to acquire an energy distribution situation.

It is assumed that the upper, lower, left, and right edge locations of the image are four areas to be detected. Each area to be detected is divided into small blocks, for example, blocks of 8×8 pixels, and then the Discrete Cosine Transform is executed. Coefficients of different locations in a frequency domain represent a high frequency portion and a low frequency portion of the image, energy in the high frequency portion is high, and energy in the low frequency portion is low, so total texture energy of each of the small blocks may be calculated by selecting different transformation coefficients for combination. In many situations, energy of a word area in single color space is very low, so texture energy of each of the small blocks in Y, Cb, and Cr space is calculated respectively, and then the total texture energy of each small block in the Y, Cb, and Cr space is calculated.

303: Determine important areas and non-important areas.

The size and the length of the word area are unknown, so the word area generally may not be effectively selected through a single threshold. Therefore, a first threshold and a second threshold are set. An area where the total texture energy of the small block is greater than the first threshold is first selected, and then the total texture energy of the small block in the selected area is compared with the second threshold to select an area where the total texture energy of the small block is greater than the second threshold as an important area. At this time, an area outside the important area is determined as a non-important area. The important area is generally a word area with high reliability, and the non-important area includes a word area having low texture energy and a non-word area.

304: Based on the important area, merge the non-important area to determine a detected word area.

The non-important area is merged based on the important area to acquire a further positioned accurate word area. The area merging indicates that a new area including all areas to be merged is adopted, where the new area is a union of the areas to be merged. A specific merging manner may include: taking minimum X and Y coordinates of an upper-left corner of all the areas as coordinates of an upper-left corner of the new area, and taking maximum X and Y coordinates of a lower-right corner of all the areas as X and Y coordinates of a lower-right corner of the new area.

Based on the foregoing four steps, the word area detection is completed.

Step 202: Mark the word area.

The detected word area may be marked with multiple rectangle areas, and a weight is set for each of the areas. A rectangle area indicates a range of the word area, and the weight indicates importance of the word area. The weight may be set in many manners. For example, floating point numbers ranging from 0 to 1 are taken to represent weights, where 0 indicates that the importance is the lowest, and 1 indicates that the importance is the highest. It may be understood that, the rectangle area is adopted based on a regular display manner of the words. During specific implementation, other areas may be selected for marking according to a display angle of the words.

Step 203: Perform conversion processing by adopting a non-linear scaling algorithm.

This step adopts the non-linear scaling algorithm based on target Region of Interest (ROI) mapping. The algorithm takes into account of a weight of each pixel in an image. For a pixel with a high weight, a scaling factor is small, so distortion is small. For a pixel with a low weight, the scaling factor is great, so the distortion is great. The word area is regarded as the area with the high weight, so it may be ensured that no or small distortion in the word area occurs.

In this step, an ROI map of the image needs to be calculated. The ROI map is a gray-scale map. A value of each pixel in the ROI map is a weight of a corresponding pixel in the original image. A smaller value of the pixel represents a lighter weight of the pixel, and a larger value of the pixel in the ROI map represents a heavier weight of the pixel. A value range of the gray-scale map is 0 to 255, which may be normalized to a weight value ranging from 0 to 1. The weight value represented in the ROI map may be an integer or a floating point number. A measurement criterion of the weight is an energy equation. In the image, a flat area lacking textures generally has low energy, and an area having abundant textures and edges generally has high energy. Many kinds of energy equations exist. Common energy equations include $L_{1\text{-}norm}$ gradient energy $e_l$ and $L_{2\text{-}norm}$ gradient energy $e_2$, which are shown in the following Equation (1) and Equation (2) respectively:

$$e_1(I) = \left|\frac{\partial}{\partial x}I\right| + \left|\frac{\partial}{\partial y}I\right| \qquad \text{Equation (1)}$$

$$e_2(I) = \sqrt{\left|\frac{\partial}{\partial x}I\right|^2 + \left|\frac{\partial}{\partial y}I\right|^2} \qquad \text{Equation (2)}$$

in the equations, I represents a gray value of a pixel, x represents a horizontal coordinate (a row number) of a pixel, and y represents a vertical coordinate (a column number) of a pixel.

For a special area with a high weight, for example the word area, a high energy value may be set. For example, in the embodiment of the present invention, the word area is the important area, and the distortion of the word area is expected to be as small as possible, so pixels of the word area may be set to larger energy values in the whole image, for example, maximum energy values, that is, $E_{Text}(i, j)=\text{Max}(E)$, where i represents a row number of a pixel in the word area, j represents a column number, E represents energy, and $E_{text}$ represents energy of the word area.

(1) Cases of Scaling Down the Image

For each pixel, a scaled down value may be calculated according to the weight. For the whole image, a scaled down image may be determined. Considering a row, for the case of scaling down one pixel in each row on an image with a width of w, a scaled down value of each pixel is $$s(i) = 1/E(i)\sum_{j=1}^{w} 1/E(j),$$

where i and j each are a row index.

For the case of scaling down k pixels in each row, a scaled down value of the k pixels is $S(k,s)=ks(i)$. In order to avoid rearrangement of pixel mapping locations, the scaled down value of each pixel may not exceed 1, that is, the following two equations need to be satisfied:

$$S(k, s) = \min(k_0 s, 1), \sum_{i=1}^{w} \min(k_0(i)s(i), 1) = k$$

It should be noted that, processing performed on each column is similar to processing performed on each row.

In order to avoid aliasing phenomena, correlation between rows or columns is further considered. For row scaling, $s(x, y) \approx s(x, y-1)$. If the energy $E(x, y)$ of a certain pixel is higher, $s(x, y-1)$ is closer to $s(x, y)$, so the following constraint condition may be used to process an energy map, so as to make the image be smoothed in a two-dimensional (2D) space domain:

$$E(x,y)=K_1 \cdot E(x,y-1)+K_2 \cdot E(x,y)$$

where parameters may be set according to actual situations and may be generally set as $K_1=1$ and $K_2=0\sim0.2$.

For a video sequence, if the scaling is performed frame by frame, because the acquired scaled down image is related to content of the image, obvious jittering may occur, so three-dimensional (3D) time domain smoothing needs to be considered for video scaling. The 3D time domain smoothing may be performed in two manners. In the case that the content of the image changes slightly, a scaled down image may only be determined during a first frame, and subsequent frames are all scaled by using the scaled down image, that is, S(x, y, t)=S(x, y, 1). The other manner is that two frames adjacent in a time domain are smoothed by adopting a method similar to 2D space domain smoothing. The two frames adjacent in the time domain are highly correlated, so the following constraint condition may be used to process the energy map:

$$E(x,y,t)=K_3 \cdot E(x,y,t-1)+K_4 \cdot E(x,y,t)$$

where parameters may be set according to actual situations and may be generally set as $K_3=1$ and $K_4=0\sim0.2$.

After the scaled down image is determined, mapping from a source image to a target image is needed. A forward mapping method may be adopted to calculate a location, coordinates, of a certain pixel of the source image on the target image through an accumulated scaled down value.

For example, for the row scaling, the following equation may be acquired:

$$x'_i = x_i - \sum_{j=1}^{i-1} s(j).$$

An acquired row coordinate x' of the target image is a floating point value, and an integer coordinate value may be acquired through an interpolation algorithm. The interpolation algorithm may be a bilinear interpolation algorithm or a cubic convolution algorithm.

(2) Cases of Scaling Up the Image

For each pixel, a scaled down value may be calculated according to the weight. The scaled down value may be considered as a negative value. That is, for the case of scaling up k pixels, the scaled down value may be indicated as $S(k,s)=-ks(i)$. For the case of scaling up the image, it may be considered that no pixel scaling constraint exists, because one pixel may not be scaled down by more than 1 unit, but may be scaled up unlimitedly.

After the conversion processing is performed by adopting the non-linear scaling algorithm, the converted image is acquired, and the image may be output for display.

It should be noted that, the foregoing illustrates the non-linear scaling algorithm based on the target ROI mapping, but the present invention is not limited to the non-linear scaling algorithm based on the target ROI mapping. Other non-linear scaling algorithms may also be adopted, for example, an area-based non-linear scaling algorithm may be adopted. A main difference between the area-based non-linear scaling algorithm and the ROI-based non-linear scaling algorithm lies in that, in the area-based non-linear scaling algorithm, a weight is set for a set area rather that a weight is set according to a pixel. Other processes are similar.

It may be seen from the content of Embodiment 2 that, in technical solution according to the embodiment of the present invention, the word area of the image is detected to acquire the detected word area and the weight is marked, and the conversion processing is performed on the image by adopting the non-linear scaling algorithm according to the word area, so that an important content area, such as the word area, in the converted image are not lost and may be retained and displayed without distortion.

Figure 4:
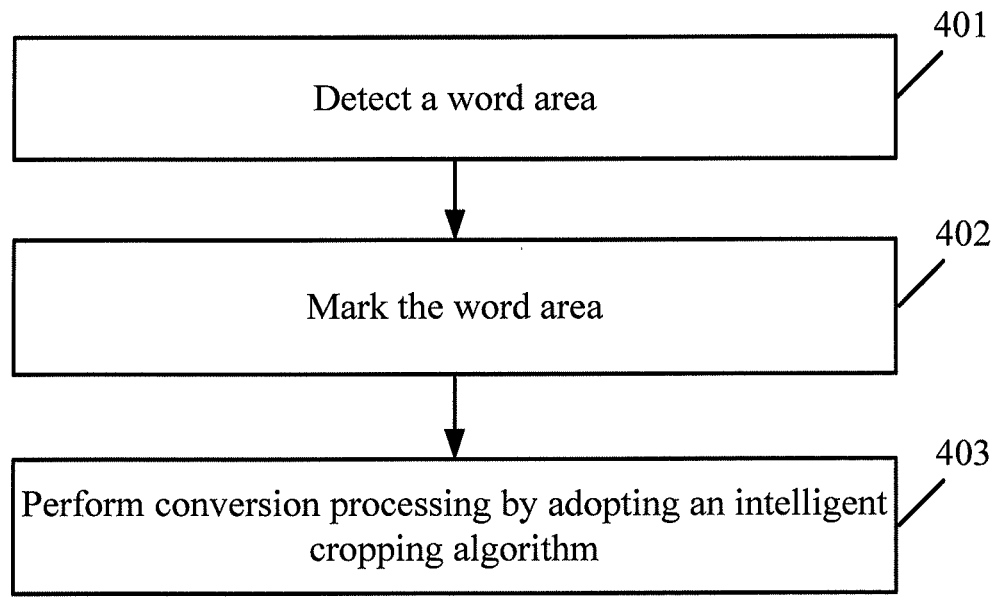
FIG. 4 is a flow chart of an image conversion method according to Embodiment 3 of the present invention.

FIG. 4 is a flow chart of an image conversion method according to Embodiment 3 of the present invention. The main difference between Embodiment 3 and Embodiment 2 lies in that different algorithms are adopted in conversion processing. As shown in FIG. 4, the method mainly includes the following steps:

Step 401: Detect a word area.

Step 402: Mark the word area.

Content of steps 401 and 402 are substantially the same as content of steps 201 and 202 in Embodiment 2 and are not described herein again. It should be noted that, in this embodiment, the word area may not be marked with a weight.

Step 403: Perform conversion processing by adopting an intelligent cropping algorithm.

In this step, when an image is cropped by using the intelligent cropping algorithm, a location of the word area determined in the foregoing step is considered, so that a cropped area does not include the word area, and therefore content of the word area is not lost.

Figure 5:
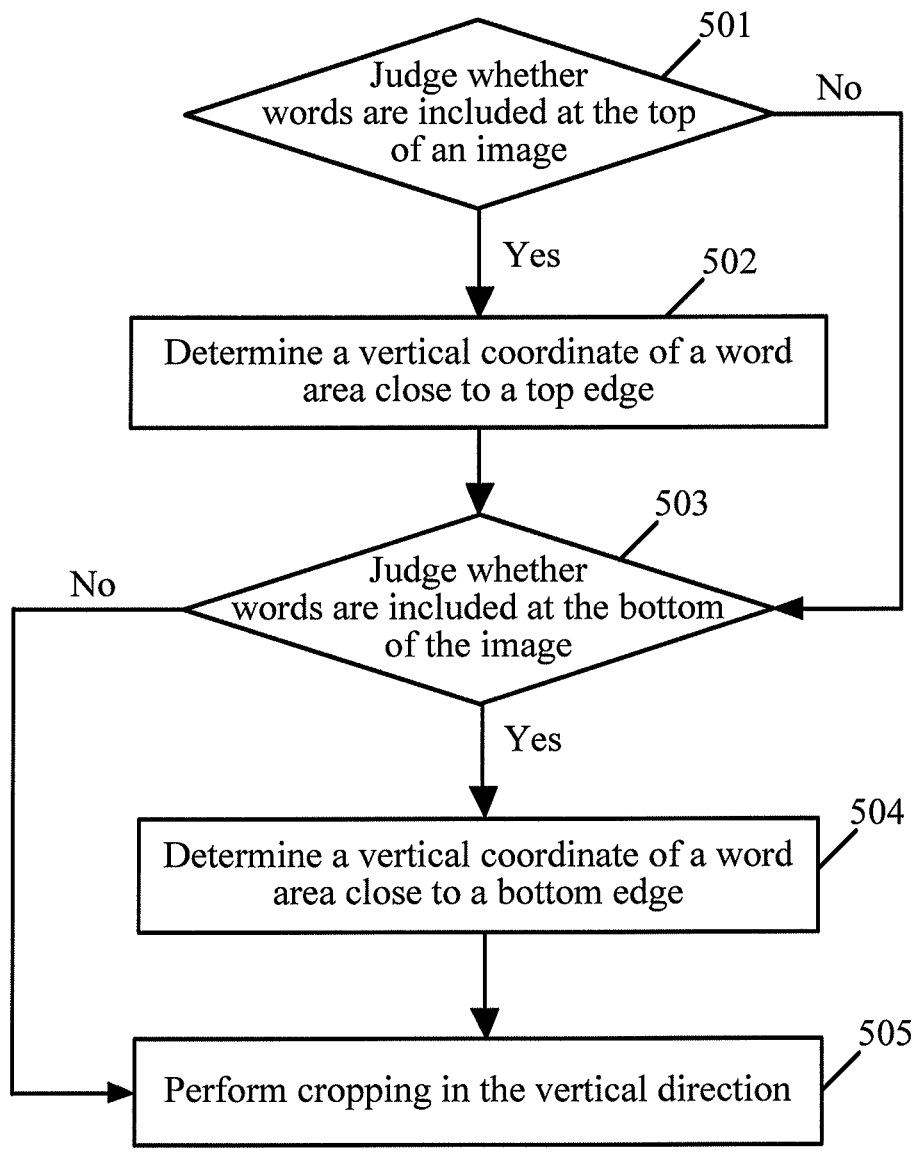
FIG. 5 is a flow chart of adopting an intelligent cropping algorithm to perform processing in a vertical direction according to Embodiment 3 of the present invention.

For the process in step 403, reference may be made to FIG. 5. FIG. 5 is a flow chart of adopting the intelligent cropping algorithm to perform processing in a vertical direction according to Embodiment 3 of the present invention. The procedure includes the following steps:

501: Judge whether words are included at the top of an image; and if the words are included at the top of the image, the procedure proceeds to step 502, and if the words are not included at the top of the image, the procedure proceeds to step 503.

It is determined, according to the word area detected in the foregoing step, whether the word area is located in an upper part of the image or a lower part of the image, which may be implemented by comparing a distance from a height coordinate of the word area to an upper boundary of the image with a distance from the height coordinate of the word area to a lower boundary of the image. If the word area is located in the upper part of the image, it may be determined that the words are included at the top of the image, the procedure proceeds to step 502. If the word area is not located in the upper part of the image, the procedure proceeds to step 503.

502: Determine a vertical coordinate of a word area close to a top edge.

When it is assumed that only one word area exists in the upper part of the image, the vertical coordinate of the word area close to the top edge is directly determined. When it is assumed that two word areas $T_1$ and $T_2$ exist in the upper part of the image, it is determined which one of the two word areas is closer to the edge of the image, and if $T_2$ is closer to the upper boundary than $T_1$, the vertical coordinate of the word area $T_2$ close to the top edge is determined, that is, a distance from a height coordinate of $T_2$ to the upper boundary is used as a height of an image to be cropped.

503: Judge whether words are included at the bottom of the image; and if the words are included at the bottom of the image, the procedure proceeds to step 504, and if the words are not included at the bottom of the image, the procedure proceeds to step 505.

It is determined, according to the word area detected in the foregoing step, whether the word area is located in an upper part of the image or a lower part of the image, which may be implemented by comparing a distance from a height coordinate of the word area to an upper boundary of the image with a distance from the height coordinate of the word area to a lower boundary of the image. If the word area is located in the lower part of the image, it may be determined that the words are included at the bottom of the image, the procedure proceeds to step 504. If the word area is not located in the lower part of the image, the procedure proceeds to step 505.

504: Determine a vertical coordinate of a word area close to a bottom edge.

When it is assumed that only one word area exists in the lower part of the image, the vertical coordinate of the word area close to the bottom edge is directly determined. When it is assumed that two word areas $T_1$ and $T_2$ exist in the lower part of the image, it is determined which one of the two word areas is closer to the edge of the image, and if $T_2$ is closer to the lower boundary than $T_1$, the vertical coordinate of the word area $T_2$ close to the bottom edge is determined, that is, a distance from a height coordinate of $T_2$ to the lower boundary is used as a height of an image to be cropped.

505: Perform cropping in the vertical direction.

If only the word area in the upper part exists, after it is determined, according to the vertical coordinate of the word area close to the top edge, that the word area in the upper part needs to be retained, a remaining cropping height may be set in the lower boundary area of the image. If only the word area in the lower part exists, after it is determined, according to the vertical coordinate of the word area close to the bottom edge, that the word area in the lower part needs to be retained, a remaining cropping height may be set in the upper boundary area of the image. If the word areas exist in both the upper part and the lower part, the word areas in the upper part and the lower part need to be retained according to the vertical coordinates of the word area close to the top edge and the word area close to the bottom edge at the same time, and then cropping on other areas is performed.

After the conversion processing is performed by adopting the intelligent cropping algorithm, the converted image is acquired, and the image may be output for display.

It should be noted that, the foregoing illustrates tailoring in the vertical direction, and cropping in a horizontal direction is similar.

It should also be noted that, if the cropped area still may not satisfy a resolution requirement of a target image because the word areas exist in both the upper part and the lower part, linear or non-linear scaling processing may be performed on the cropped image to enable the cropped image to reach the resolution of the target image. For the non-linear scaling processing, reference may be made to the method in Embodiment 2, which is of the same principles. Alternatively, other scaling processing methods may be adopted.

It should also be noted that, the foregoing illustrates that the conversion process is performed by adopting the intelligent cropping algorithm, but the present invention is not limited to the intelligent cropping algorithm, and other algorithms taking into account of a word area for cropping are also applicable.

It may be seen from the content of Embodiment 3 that, in technical solution according to the embodiment of the present invention, the word area of the image is detected to acquire the detected word area, and the conversion processing is performed on the image by adopting the intelligent cropping algorithm according to the word area, so that an important content area, such as the word area, in the converted image is not lost and may be retained and displayed without distortion.

It should be noted that, the foregoing illustrates that the conversion process is performed by adopting the non-linear scaling algorithm or the intelligent cropping algorithm after the word area is detected, but the present invention is not limited to the non-linear scaling algorithm and the intelligent cropping algorithm, and other scaling processing methods may also be adopted.

The image conversion method according to the embodiment of the present invention is described in detail in the foregoing. Accordingly, an embodiment of the present invention provides a conversion device and a display system.

Figure 6:
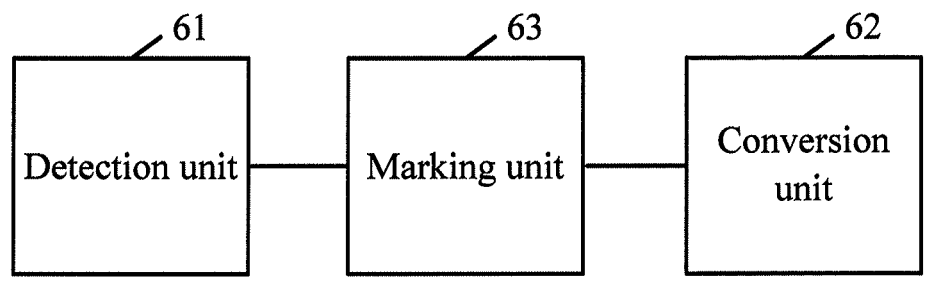
FIG. 6 is a schematic structural diagram of a conversion device according to an embodiment of the present invention.

FIG. 6 is a schematic structural diagram of a conversion device according to an embodiment of the present invention.

As shown in FIG. 6, the conversion device includes a detection unit 61 and a conversion unit 62.

The detection unit 61 is configured to perform word area detection on an image to acquire a detected word area.

The conversion unit 62 is configured to perform conversion processing on the image according to the word area to acquire a converted image that has an aspect ratio different from that of an unconverted image.

Preferably, the conversion device may also include a marking unit 63.

The marking unit 63 is configured to mark the detected word area with a weight. The conversion unit 62 further refers to the weight of the word area when performing the conversion processing on the image.

Preferably, the conversion unit 62 may set the weight of the word area marked by the marking unit to a high weight, set a weight of a non-word area to a low weight, and scale up/down the image according to a set aspect ratio by adopting a non-linear scaling algorithm according to the weight of the word area and the weight of the non-word area. The non-linear scaling algorithm may be a non-linear scaling algorithm supporting important area-based mapping.

Alternatively, preferably, the conversion unit 62 may crop the image according to a set aspect ratio by adopting a cropping algorithm. The cropped image includes the word area. The cropping algorithm may be an intelligent cropping algorithm.

Furthermore, if the conversion unit 62 finds that an aspect ratio of the cropped image does not reach the set aspect ratio, the conversion unit 62 further performs scaling processing on the cropped image.

Figure 7:
FIG. 7 is a schematic structural diagram of a display system according to an embodiment of the present invention.

FIG. 7 is a schematic structural diagram of a display system according to an embodiment of the present invention. As shown in FIG. 7, the display system includes a conversion device 71 and a display device 72.

The conversion device 71 is configured to perform word area detection on an image to acquire a detected word area, and perform conversion processing on the image according to the word area to acquire a converted image that has an aspect ratio different from that of an unconverted image.

The display device 72 is configured to display the converted image.

The conversion device 71 has a structure shown in FIG. 6. For details, reference may be made to the foregoing description, and the details are not described herein again.

To sum up, in the embodiments of the present invention, the word area detection is first performed on the image to acquire the detected word area, and then the non-uniform ratio resolution conversion processing is performed on the image according to the word area, so that an important content area, such as the word area, in the converted image is not lost and may be retained and displayed without distortion.

Persons skilled in the art should understand that all or a part of the steps of the method according to the embodiments of the present invention may be implemented by a program instructing relevant hardware. The program may be stored in a computer readable storage medium. The storage medium may include a read-only memory (ROM), a random-access memory (RAM), a magnetic disk, or an optical disk.

The image conversion method, the conversion device, and the display system according to the embodiments of the present invention are described in detail in the foregoing. The principle and implementation of the present invention are described herein through specific examples. The description about the embodiments is provided for ease of understanding of the method and the core idea disclosed by the present invention. Persons skilled in the art may make variations to the present invention in terms of the specific implementations and application scopes according to the idea of the present invention. Therefore, the specification shall not be construed as a limit to the present invention.

What is claimed is:

1. An image conversion method, comprising:
performing word area detection on an image to acquire a detected word area wherein after the detection, marking a weight of the detected word area; and
performing conversion processing on the image according to the word area to acquire a converted image that has an aspect ratio different from that of an unconverted image; wherein the conversion processing utilizing the weight of the detected word area, and wherein the conversion processing comprises cropping the image according to a set aspect ratio by adopting a cropping algorithm according to the word area, wherein the cropped image comprises the word area.

2. The image conversion method according to claim 1, wherein:
the performing of the conversion processing on the image according to the word area comprising: performing scaling processing on the image according to the word area.

3. The image conversion method according to claim 2, wherein:
the scaling processing comprising: setting the weight of the word area to a high weight, setting a weight of a non-word area to a low weight, and scaling up/down the image according to a set aspect ratio by adopting a non-linear scaling algorithm according to the weight of the word area and the weight of the non-word area.

4. The image conversion method according to claim 1, further comprising:
if an aspect ratio of the cropped image does not reach the set aspect ratio, performing scaling processing on the cropped image.

5. A conversion device, comprising:
a detection unit, configured to perform word area detection on an image to acquire a detected word area; and
a conversion unit, configured to perform conversion processing on the image according to the word area to acquire a converted image that has an aspect ratio different from that of an unconverted image, and the conversion unit configured to crop the image according to a set aspect ratio by adopting a cropping algorithm, wherein the cropped image comprises the word area; and
a marking unit, configured to mark a weight of the detected word area, and the conversion unit utilizes the weight of the word area to perform the conversion processing on the image.

6. The conversion device according to claim 5, wherein:
the conversion unit sets the weight of the word area marked by the marking unit to a high weight, sets a weight of a non-word area to a low weight, and scales up/down the image according to a set aspect ratio by adopting a non-linear scaling algorithm according to the weight of the word area and the weight of the non-word area.

7. The conversion device according to claim 5, wherein: if the conversion unit finds that an aspect ratio of the cropped image does not reach the set aspect ratio, the conversion unit further performs scaling processing on the cropped image.

8. An image conversion method, comprising:
performing word area detection on an image to acquire a detected word area; and
performing conversion processing on the image according to the word area to acquire a converted image that has an aspect ratio different from that of an unconverted image; wherein:
the conversion processing on the image comprising:
performing scaling processing on the image according to the word area, or performing cropping processing on the image according to the word area;
the cropping processing on the image comprising:
cropping the image according to a set aspect ratio by adopting a cropping algorithm according to the word area, wherein the cropped image comprises the word area.

9. The image conversion method according to claim 8, wherein:
the scaling processing on the image according to the word area comprising:
setting the weight of the word area to a high weight, setting a weight of a non-word area to a low weight, and scaling up/down the image according to a set aspect ratio by adopting a non-linear scaling algorithm according to the weight of the word area and the weight of the non-word area.

10. The image conversion method according to claim 8, wherein:
if an aspect ratio of the cropped image does not reach the set aspect ratio, performing scaling processing on the cropped image.

11. A conversion device, comprising:
a detection unit, configured to perform word area detection on an image to acquire a detected word area; and
a conversion unit, configured to perform conversion processing on the image according to the word area to acquire a converted image that has an aspect ratio different from that of an unconverted image,
wherein the conversion unit:
sets the weight of the word area marked by the marking unit to a high weight,
sets a weight of a non-word area to a low weight, and scales up/down the image according to a set aspect ratio by adopting a non-linear scaling algorithm according to the weight of the word area and the weight of the non-word area; or
crops the image according to a set aspect ratio by adopting a cropping algorithm, wherein the cropped image comprises the word area; and
if the conversion unit finds that an aspect ratio of the cropped image does not reach the set aspect ratio, the conversion unit performs scaling processing on the cropped image.

12. A display system, comprising:
a conversion device, configured to perform word area detection on an image to acquire a detected word area, and perform conversion processing on the image according to the word area to acquire a converted image that has an aspect ratio different from that of an unconverted image; and
a display device, configured to display the converted image;
wherein the conversion unit:
sets the weight of the word area marked by the marking unit to a high weight,
sets a weight of a non-word area to a low weight, and scales up/down the image according to a set aspect ratio by adopting a non-linear scaling algorithm according to the weight of the word area and the weight of the non-word area; or
crops the image according to a set aspect ratio by adopting a cropping algorithm, wherein the cropped image comprises the word area; and if the conversion unit finds that an aspect ratio of the cropped image does not reach the set aspect ratio, the conversion unit performs scaling processing on the cropped image.

* * * * *